Inventors
FREDERICK JAMES WALKER &
WILLIAM HAROLD BENT
By
Mason, Fenwick & Lawrence
Attorneys

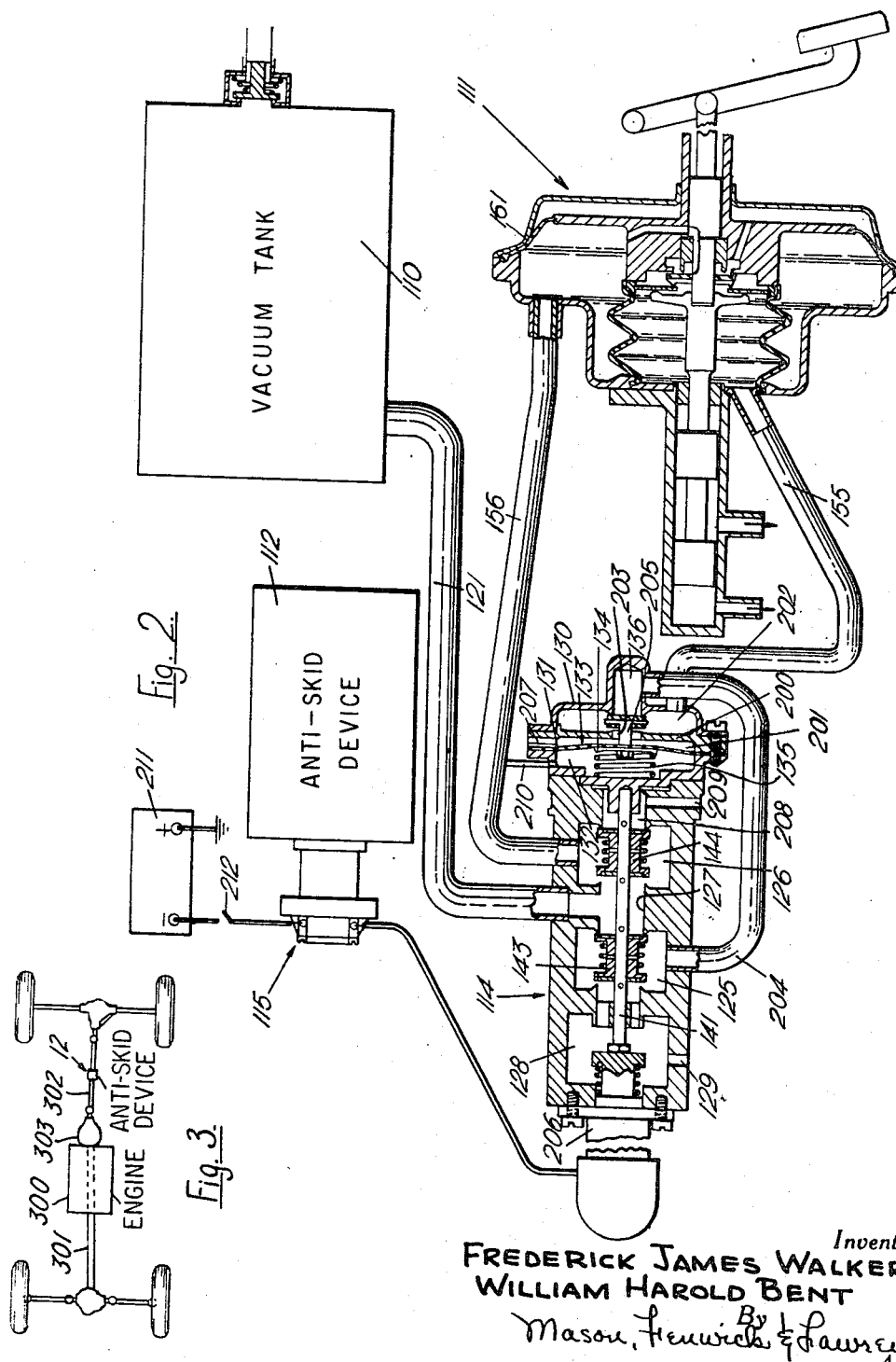

United States Patent Office 3,401,986
Patented Sept. 17, 1968

3,401,986
VEHICLE BRAKING SYSTEM
Frederick James Walker, Kenilworth, England, and William Harold Bent, Wantirna, Victoria, Australia, assignors to Harry Ferguson Research Limited, Abbotswood, Stow-on-the-Wold, Gloucestershire, England, a British company
Continuation of abandoned application Ser. No. 411,967, Nov. 10, 1964. This application Jan. 26, 1967, Ser. No. 612,053
Claims priority, application Great Britain, Nov. 16, 1963, 45,518/63
10 Claims. (Cl. 303—21)

ABSTRACT OF THE DISCLOSURE

A braking system includes a servo-mechanism, an anti-skid device operable in response to the inertia changes, and valve means operatively connected to said anti-skid device and to said servo-mechanism. When the anti-skid device operates, the valve is operated to reduce, remove and reverse the servo-assistance sequentially in order to decrease the braking effect.

---

This invention is a continuation of our prior application Ser. No. 411,967 filed Nov. 10, 1964, now abandoned.

The invention is a servo-assisted braking system, an anti-skid device operable in response to inertia changes, and valve means interposed in the servo-system and operatively connected to said anti-skid device, said servo mechanism including a movable member and means for introducing fluid at different pressures into contact with opposite sides of said movable member, said valve means acting to change over the fluid pressures acting on opposite sides of said movable member thus to reduce, remove and reverse the servo-assistance sequentially in order to decrease the braking effect.

Preferably said servo-mechanism is a vacuum servo-mechanism and includes a flexible member and means for introducing air and vacuum pressures respectively into contact with opposite sides of said flexible member, said valve means acting to change over the air and vacuum pressures on opposite sides of said flexible member thus to reduce, remove and reverse the servo-assistance sequentially in order to decrease the braking effect.

Preferably also said anti-skid device operates in response to changes in rotary inertia and is associated with a rotary part of the transmission of a vehicle in which the braking system is incorporated.

Embodiments of the invention will now be described, by way of example only, with reference to the accompanying drawings, in which:

FIG. 2 illustrates a modification of the system shown in FIG. 1; and

FIG. 3 is a diagrammatic plan view of a four-wheel drive motor vehicle.

Figure 1:
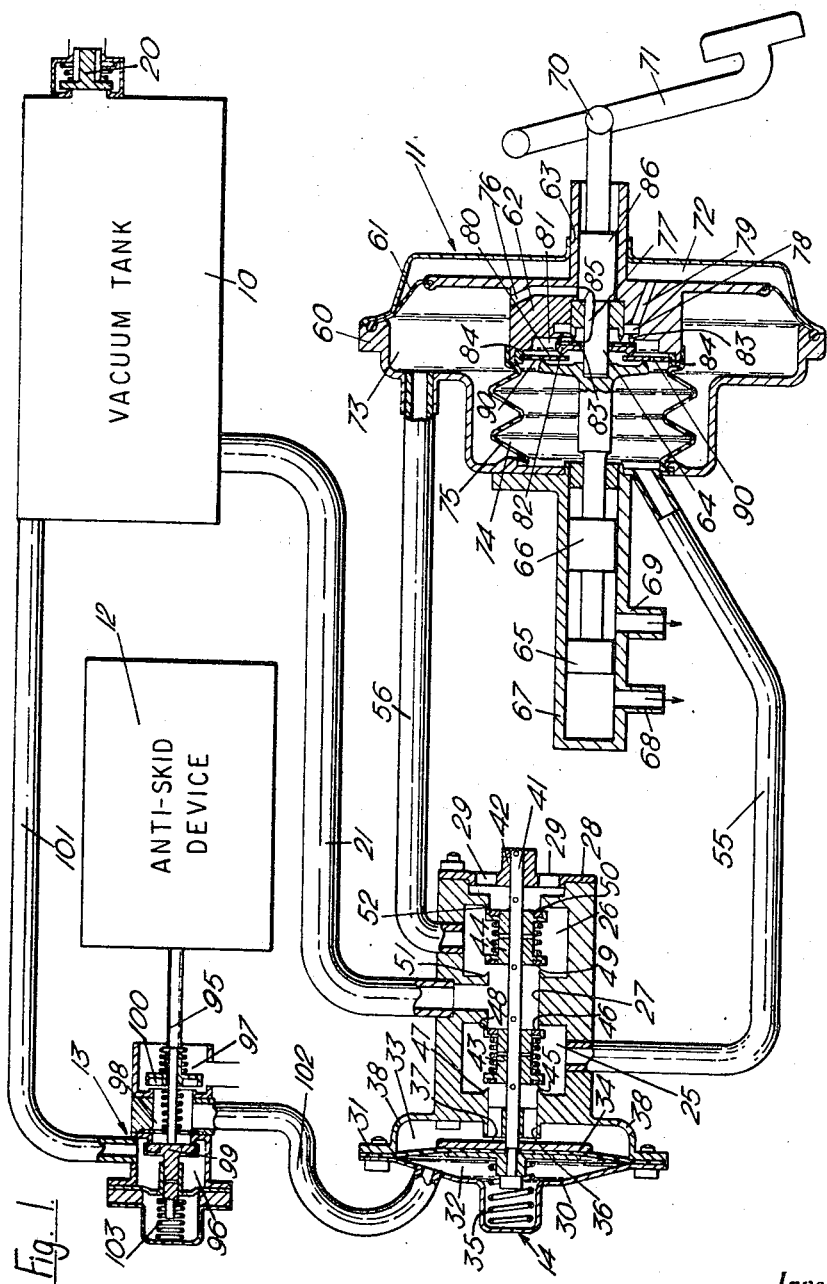
FIG. 1 illustrates a suspended-vacuum, servo-assisted braking system.

The systems illustrated are intended for use in vehicles in which four or more wheels are engine driven through a controlled main differential gear and interwheel differential gears which may or may not be controlled. By a controlled differential gear is meant a differential gear in which the output shafts cannot differ in speed by more than a predetermined amount.

Referring to the drawings, there is shown in FIG. 1 a braking system including a vacuum tank 10, vacuum servo-assisted brake applying means 11; a rotary inertia operated anti-skid device 12, a control valve 13, and a change-over valve 14. Vacuum is obtained from the vehicle engine through a non-return valve 20 mounted on the tank 10. A pipe 21 connects the tank 10 to the vacuum servo-assisted brake applying means 11 by way of the change-over valve 14.

The change-over valve 14, consists of two chambers 25 and 26 interconnected by a passage 27. A cover plate 28, is secured to one end of the valve and has apertures 29 therein. A housing 30 is mounted on the other end of the valve and includes a flexible member or diaphragm 31 dividing the housing into two chambers 32 and 33. An abutment plate 34 is carried by the diaphragm 31 centrally thereof and is urged by a spring 35 to the right in FIG. 1 towards a passage 36 leading to the valve chamber 25. A clearance gap 37 is however always maintained between the plate 34 and the passage 36 to allow air entering the chamber 33 of the housing 30 through apertures 38, to enter the chamber 25.

A rod 41 extends axially of the valve 14 through the passages 27 and 36 and the chambers 25 and 26 one end of the rod being secured to the plate 34 centrally thereof so as to be movable therewith and the other end being slidably mounted in a boss 42 in the cover plate 28. Valve means in the form of valve members 43 and 44 are mounted in spaced relation on the rod 41 within the chambers 25 and 26 respectively. The valve member 43 has abutment faces 45 and 46 engageable alternately with seats 47 and 48 one on each side of the chamber 25 and the valve member 44 has abutment faces 49 and 50 engageable alternately with seats 51 and 52 one on each side of the chamber 26.

The pipe 21 is connected to the passage 27 of the valve 14 and pipes 55 and 56 connect the chambers 25 and 26 respectively to the vacuum servo-assisted brake-applying means 11. The latter consists of a housing 60 and a flexible member or diaphragm 61 mounted in the housing and carrying a valve body 62. The valve body 62 is slidably mounted in an aperture 63 in the housing 60 and mounts a piston assembly 64 one end of which is provided with two pistons 65 and 66 and extends from the left hand end of the housing into a tandem master cylinder 67 connected by pipe 68 and 69 to the front and rear brakes of the vehicle. The tandem master cylinder 67 forms part of a static hydraulic system connected to the brakes. The other end of the piston assembly 64 extends from the right hand end of the housing 60 and is pivotably connected at 70 to a brake pedal 71 adapted for operation by the foot of the vehicle driver.

The diaphragm 61 and valve body 62 divide the housing 60 into two chambers 72 and 73 and a third chamber 74 is formed within the chamber 73 by a bellows 75 extending between the valve body 62 and the left hand end of the housing 60. The pipes 56 and 55 open into the chambers 73 and 74 respectively. A passage 76 is formed in the valve body 62 and connects the chamber 73 to a groove 77 formed in the piston assembly 64. This groove communicates with a chamber 78 formed in the valve body 62 which chamber is connected by a passage 79 to the chamber 72. The chamber 74 is connected through an annular valve plate 80, having a circumferential series of apertures 90 therein, to a chamber 81 which latter is bounded by the valve plate 80, the valve body 62 and a valve member 82 slidably mounted on the piston assembly 64. The valve member 82 is sandwiched between abutments 83 on the valve body 62 and the valve plate 80, which latter is flexible and is secured at its outer edge 84 to the valve body 62. A further valve member 85 is mounted on the piston assembly 64 and is slidably engaged in a bore in the valve body 62. An increased diameter portion 86 of the piston assembly 64 forms an abutment and seat for the valve member 85.

Normal operation of the braking system will now be described. The system is shown in FIG. 1 in the "brakes off" position. In this position vacuum from the tank 10 is communicated through the pipe 21 to the passage 27 in the valve 14 and hence through the chamber 26 and pipe 56 to the chamber 73 of the brake-applying means 11. This chamber is connected to chamber 72 through passage 76, groove 77, chamber 78 and passage 79. Thus the chamber 72 is at vacuum pressure. Simultaneously the chamber 74 is communicated with the atmosphere through pipe 55, chamber 25, passage 36, chamber 33 and apertures 38.

When the brake pedal 71 is depressed, the piston assembly 64 moves to the left in FIG. 1, the increased diameter portion 86 of the piston assembly 64 pushes the valve member 85 to the left to abut against the valve member 82. This closes the valve member 85 to cut off communication between the chambers 72 and 73. Further movement of the piston assembly causes the valve member 85 to push the valve member 82 to the left, this leftward movement of the valve member 82 being permitted by bending of the annular valve plate 80. The chamber 81 is thus brought into communication with the chamber 72 through chamber 78 and passage 79, that is, chamber 72 is connected to atmosphere. Since the chamber 73 is at vacuum pressure the pressure differential between the chambers 72 and 73 assists in moving the valve body 62 and piston assembly 64 to the left to apply the brakes. When the foot pressure on the brake pedal 71 is released the pressure in the chamber 74 returns the valve body 62 and piston assembly 64 to their initial "brakes off" position.

To prevent skidding due to locking of the vehicle road wheels, the rotary inertia operated device 12 is connected to the front or rear propeller shaft of the vehicle. The device may be of any known type such as, for example, that sold under the registered trademark "Maxaret" by the Dunlop Rubber Company Limited, and serves, when deceleration of the transmission exceeds a predetermined figure to move a rod 95 to the left in FIG. 1.

The rod 95 forms an element of the control valve 13, which latter includes two inlet chambers 96 and 97 disposed one on each side of a central outlet chamber 98. Valves 99 and 100 control the openings connecting the chambers 96 and 97 to the chamber 98. The chamber 96 is connected by a pipe 101 to the vacuum tank 10 and the chamber 97 is open to the atmosphere. An outlet pipe 102 connects the outlet chamber 98 to the chamber 32 of the amplifying valve 14.

The valve 99 is normally urged against the opening connecting chambers 96 and 98 by a spring 103 so as to prevent communication between those chambers. The valve 100 is normally urged clear of the opening connecting chambers 97 and 98 so as to open the chamber 98 to atmosphere. The outlet pipe 102 is thus connected to atmosphere and the pressure in both chambers 32 and 33 in the housing 30 of change-over valve 14 is the same. These conditions remain unaltered during normal braking.

If however the braking is such that the vehicle wheels tend to lock, the rotary inertia operated device moves the rod 95 to the left in known manner. This effects closing of the valve 100 and opening of the valve 99 to connect the pipe 102 and chamber 32 to the vacuum from the tank 10 by way of chambers 96 and 98. Since chamber 33 of change-over valve 14 is still at atmospheric pressure, the pressure differential between chambers 32 and 33 causes the diaphragm 31, plate 34 and rod 41 to move to the left. This moves the valve members 43 and 44 to the left into abutment with the seats 47 and 51 respectively so that chamber 74 of the vacuum servo-assisted brake applying means 11 is connected to vacuum tank 10 through pipe 55, passage 27 and pipe 21 so that the air pressure in chamber 74 drops.

Simultaneously chamber 73 of the brake-applying means 11 is connected to atmosphere through pipe 56, chamber 26 and apertures 29. Thus the pressure sources connected to opposite sides of the diaphragm 61 and valve body 62 are changed over, that is, the chamber 72 which was formerly at atmospheric pressure is now at a pressure lower than atmosphere, and the chamber 73, formerly at vacuum pressure, is connected to atmosphere, so that the vacuum is becoming less, i.e., the pressure urging the diaphragm 61 to the right in FIG. 1 is increasing.

Thus the force tending to move the diaphragm 61, valve body 62 and piston assembly 64 to the left is reduced and the pedal 71 reacts against the action of the driver's foot. The braking effect is thus reduced and the "push-back" warns the driver that the wheels are tending to lock. The release of the brake pressure will allow the transmission to speed up again so that the rotary inertia operated device 12 will move the rod 95 to the right. Thus the pipe 102 will again be open to atmosphere, the rod 41 will move to the right and the system will revert to the "brakes-off" position shown in the drawing. Once the tendency to lock has been overcome in this way, the continued pressure of the driver's foot on the brake pedal 71 re-applies the brakes. If, as the driver continues to apply the brakes, the wheels again tend to lock the rotary inertia operated device will again come into operation to momentarily release the brakes. This process continues until the vehicle stops and the brake pressure is released when the valve 100 of the control valve 13 opens the pipe 102 to atmosphere and returns the system to the "brakes-off" position shown in FIG. 2 where it remains due to the driver releasing his pressure on the brake pedal 71.

FIG. 2 illustrates a similar braking system to FIG. 1 but in this embodiment the rotary inertia operated device.

The system includes a vacuum tank 110, vacuum servo-assisted brake applying means 111 and rotary inertia operated device 112, all similar to the FIG. 1 embodiment. The vacuum tank 110 is connected to a change-over valve 114 which is connected to the brake applying means 111 and, by an electric circuit, to the rotary inertia operated device 112.

The change-over valve 114 includes two chambers 125 and 126 interconnected by a passage 127. A further chamber 128 is provided at one end of the valve and includes an air inlet passage 129. A housing 130 is mounted on the other end of the valve and includes a flexible diaphragm 131 dividing the housing into two chambers 132 and 133. A plate 200 divides the chamber 133 into sub-chamber 201 and 202 interconnected by a passage 203 in the plate 200.

An abutment plate 134 is carried by the diaphragm 131 centrally thereof and is urged by a spring 135 to the right in FIG. 2 towards a passage 136 connected by a transfer pipe 204 to the chamber 125. The abutment plate 134 carries a valve member 205 which is effective when moved to the right to close the passage 136. Except in emergency the valve member 205 remains in a position in which it closes the passage 203. FIG. 2 shows the position of the valve member 205 during emergency or "fail-safe" operation, which will be described hereinafter.

A rod 141 extends axially of the valve 114 and valve members 143 and 144 are mounted in spaced relation on the rod 141 within the chambers 125 and 126 respectively in a similar manner to the valve members 43 and 44 in the FIG. 1 embodiment. The rod 141 is slidable axially of the valve 114 by a solenoid 206 secured to the valve to the left of the chamber 128.

A pipe 121 connects the vacuum tank 110 to the passage 127 of the valve 114 and pipes 155 and 156 connect the sub-chamber 202 and chamber 126 respectively to the vacuum servo-assisted brake applying means 111. The latter includes a diaphragm 161 similar to the diaphragm 61 of the FIG. 1 embodiment and is in all respects identical to the FIG. 1 brake applying means 11. The sub-chamber 201 of the valve 114 is connected to atmosphere at all times by an air inlet aperture 207. A further sub-chamber 208 to the right of the chamber 126 is likewise connected to atmosphere through an air inlet aperture 209. In addition, the chamber 132 is connected to the pipe 156 by a "fail-safe" connection 210 the operation of which will be described hereinafter.

The rotary inertia operated device 112 is connected to a switch 115 which opens or closes an electrical circuit from a battery 211 through an isolating switch 212 to the solenoid 206. In the inoperative position of the device 112 the switch 115 is open and the parts of the valve 114 (except the valve member 205 and diaphragm 131) are in the positions shown in FIG. 2.

In this position the pipe 156 is connected to the vacuum tank 110 through chamber 126, passage 127 and pipe 121, and pipe 155 is connected to atmosphere through sub-chamber 202, passage 136, transfer pipe 204, chamber 125, chamber 128 and air inlet aperture 129. In this position the chamber 132 is connected to the vacuum in pipe 156 so that the abutment member 134 and valve member 205 are drawn to the left in FIG. 2. Operation of the brake applying means during normal braking is the same as for the FIG. 1 embodiment.

If the braking is such that the vehicle wheels tend to lock, the rotary inertia operated device moves to the left in FIG. 2 to close the switch 115. The solenoid 206 is thus energized and moves the rod 141 to the left. In this position the pipe 156 is connected to atmosphere through chamber 126, sub-chamber 208 and air inlet aperture 209. At the same time pipe 155 is connected to the vacuum tank 110 through sub-chamber 202, passage 136, transfer pipe 204, chamber 125, passage 127 and pipe 121. The pressures in the pipes 155 and 156 therefore fall and rise respectively so that the brakes are released as in the FIG. 1 embodiment.

When the transmission speeds up again, the rotary inertia operated device moves to the right in FIG. 2 to open the switch 115. The solenoid 206 is thus deenergized and the rod 141 is moved to the right. The pipe 155 is thus again connected to atmosphere and the pipe 156 to the vacuum tank 110 so that the brakes are again applied. If, as the driver continues to apply the brakes, the wheels again tend to lock, the rotary inertia-operated device will again come into operation to momentarily release the brakes. This process continues till the vehicle stops and the brake pressure is released.

The "fail-safe" connection 210 operates as follows. During normal braking, the pipe 156 is connected to the vacuum tank 110 and the pipe 155 to the atmosphere. During operation of the rotary inertia-operated device, the pressures in the pipes 155 and 156 tend to reverse. This tends to release the brakes and would be dangerous if it occurred at any time other than during operation of the rotary inertia-operated device. The "fail-safe" connection is provided to ensure that this situation does not arise.

During normal braking the chamber 132 is at vacuum pressure and the sub-chamber 201 is at atmospheric pressure so that the diaphragm 131 is drawn to the left against the action of the spring 135. In this position the valve member 205 seals the passage 203 and air is supplied to the pipe 155 through the transfer pipe 204, passage 136 and sub-chamber 202. When the rotary interia-operated device operates, the pipe 156 is opened to atmospheric pressure introduced through aperature 209 and sub-chamber 208 and the pressure in pipe 156 rises till the vacuum approaches zero. Due to the rapidity of operation however, the vacuum in pipe 156 never reaches zero during normal operation. Moreover, due to the narrow bore of pipe 210 more vacuum remains in the chamber 132 than in the pipe 156 since the air cannot penetrate so quickly to the chamber.

At the same time, vacuum is introduced into the transfer pipe 204 from the vacuum tank 110 through pipe 121, passage 127 and chamber 128, and passes into passage 136. Due to the differences in area of the diaphragm 131 and the valve member 205, the ratio in the embodiment being approximately 16:1, the vacuum acting on the valve member 205 would require to be sixteen times that acting on the diaphragm 131 before movement to the right would occur. As mentioned above, due to the rapidity of operation, the vacuum in pipe 156 and chamber 132 does not reach zero during normal operation and the difference in pressures on the diaphragm 131 and the valve member 205 is not normally sufficient to move the latter to the right. Thus vacuum in the passage 136 is communicated to pipe 155 through sub-chamber 202.

In this position the servo-mechanism acts against application of the brakes which is desirable at the instant of operation of the rotary inertia-operated device, but only then. With vacuum in the pipe 155 the driver cannot apply the brakes and air must be introduced into the pipe to permit normal foot operation of the brakes.

If for any reason the rod 141 moves to the right other than in response to operation of the rotary inertiaoperated device, or sticks in that position, or if the rotary inerita-operated device sticks in its operative position, then the vacuum in the chamber 132 falls below zero, that is, air pressure is introduced into the chamber. The pressure differential between the diaphragm 131 and valve member 205 is then sufficient to move the latter to the right into the position shown in FIG. 2 in which position air is introduced into the pipe 155 through aperture 207, sub-chamber 201, passage 203 and sub-chamber 202. The servo-mechanism does not therefore act against the driver's foot and the brakes may be applied, though greater foot pressure than during normal operation will be required. In effect therefore the "fail-safe" connection acts after a predetermined time lapse from operation of the rotary inertia-operated device to disable said servo-mechanism.

An advantage of the embodiments resides in the fact that the changes in the pressures in the servo-mechanism cause the brake pedal to move up against the driver's foot thus warning him that the wheels are tending to lock.

Also, by virtue of the provision of the change-over valve close to the servo-mechanism the small mechanical or electrical signal provided by the rotary inertia operated device is converted into a large pneumatic signal which is rapidly conveyed to the servo-assisted brake applying means to release the brakes.

The invention is applicable to two or four wheel drive vehicles. In the case of a two-wheel drive vehicle a servo-mechanism would normally be required for each vehicle wheel and there would be a number of anti-skid devices, one for each vehicle wheel. However, it is possible in a two wheel drive vehicle to use only one servo-mechanism and one anti-skid device, the latter being associated with any part of the transmission capable of sensing inertia changes, such as the propeller shaft. In a vehicle in which four or more wheels are engine driven through a controlled main differential gear, and inter-wheel differential gears, only a single servo-mechanism and anti-skid device are required, the anti-skid device being connected to the front or rear propeller shaft.

FIG. 3 shows such an arrangement in which the vehicle engine is shown at 300, the front and rear propeller shafts at 301 and 302 respectively and the centre differential gear at 303, the anti-ski device 12 being connected to the rear propeller shaft 302.

While in the embodiment a rotary inertia operated anti-skid device and a vacuum servo-assisted braking system are described, it will be appreciated that an anti-skid device responsive to changes in linear inertia may be used and the braking system may be hydraulic servo-assisted.

We claim:

1. A braking system assisted by a servo-mechanism, an anti-skid device operable in response to changes in rotary inertia, and valve means operatively connected to said anti-skid device and said servo-mechanism, said servo-mechanism including a movable member and means for introducing fluid at different pressures into contact with oppoiste sides of said movable member, said valve means acting, when actuated by said anti-skid device, to change over the fluid pressures acting on opposite sides of said movable member thus to reduce, remove and reverse the servo-assistance sequentially in order to decrease the braking effect.

2. A servo-assisted braking system, an anti-skid device operable in response to inertia changes, and valve means interposed in the servo-system and operatively connected to said anti-skid device, said servo-mechanism being a vacuum servo-mechanism and including a flexible member and means for introducing air and vacuum pressures respectively into contact with oppoiste sides of said flexible member, said valve means acting to change over the air and vacuum pressures on opposite sides of said flexible member thus to reduce, remove and reverse the sero-assistance sequentially in order to decrease the braking effect.

3. A braking system according to claim 2 in which said valve means is a change over valve having a first chamber communicating with one side of said flexible member and a second chamber communicating with the other side of said flexible member, means for introducing air and vacuum pressures into said first and second chambers, respectively, and valve members in said chambers operatively connected to said anti-skid device for interchanging the air and vacuum pressures introduced into said first and second chambers on operation of said anti-skid device.

4. A braking system according to claim 3 in which said anti-skid device operates in response to changes in rotary inertia and is associated with a rotary part of the transmission of a vehicle in which the braking system is incorporated.

5. A braking system assisted by a servo-mechanism, the latter including first and second chambers separated by a movable diaphragm operatively connected to the braking system, an anti-skid device adapted to be associated with a rotary part of the vehicle transmission than to be operable in response to changes in rotary inertia of said part, change over valve means having first and second chambers respectively connected by passage means to said first and second chambers of said servo-mechanism and also respectively connected by further passage means to first and second sources of fluid at different pressures, thereby to create a pressure differential across said diaphragm to assist application of the brakes, said valve means also including a valve member operatively connected to said rotary inertia device and movable on operation of the latter to simultaneosuly connect said first source to said second chamber of said valve means and said second source to said first chamber of said valve means thereby altering the pressure differential across said diaphragm to sequentially reduce, remove and reverse the servo-assistance.

6. A braking system according to claim 5 in which the operative connection between said anti-skid device and said valve means includes a flexible member forming part of said valve means and connected to said valve member, and means for selectively introducing air and vacuum pressures into contact with opposite sides of said flexible member to move same to operate said valve means.

7. A braking system according to claim 6 including a control valve having a chamber selectively connectible to sources of air and vacuum pressure and a valve member movable by said anti-skid device between an inoperative position in which air pressure is applied to said chamber and an operative position in which air pressure is replaced by vacuum pressure, said chamber being connected to one side of the flexible member of said valve means.

8. A braking system according to claim 5 in which the operative connection between said anti-skid device and said valve means includes an electric circuit including a solenoid connected to said valve member and a switch in circuit with said solenoid and operatively connected to said anti-skid device.

9. A braking system according to claim 8 including means operable after a predetermined time lapse from operation of said anti-skid device to disable said servo-mechanism.

10. A braking system according to claim 9 applied to a vehicle in which four wheels are engine driven through front and rear propeller shafts and front and rear axles composed of half-shafts, a differential gear between the front half-shafts, a differential gear between the rear half-shafts, and a controlled differential gear between the front and rear propeller shafts.

References Cited

UNITED STATES PATENTS

| | | | |
|---|---|---|---|
| 1,718,673 | 6/1929 | Wettstein | 91—376 XR |
| 1,770,194 | 7/1930 | Bragg et al. | 91—376 XR |
| 2,711,230 | 6/1955 | Wilson | 303—21 |
| 2,796,154 | 6/1957 | Stelzer. | |
| 3,004,801 | 10/1961 | Wrigley | 303—21 |
| 3,093,422 | 6/1963 | Packer et al. | 303—21 |
| 3,265,446 | 8/1966 | Cripe | 303—21 |

FOREIGN PATENTS

| | | |
|---|---|---|
| 1,330,329 | 5/1963 | France. |

DUANE A. REGER, *Primary Examiner.*